Jan. 29, 1957  H. D. KLINKER  2,779,630
WHEEL MOUNTING DEVICE
Filed March 16, 1956  2 Sheets-Sheet 1

INVENTOR.
HENRY D. KLINKER,
BY
McMorrow, Berman + Davidson
ATTORNEYS

Jan. 29, 1957 H. D. KLINKER 2,779,630
WHEEL MOUNTING DEVICE
Filed March 16, 1956 2 Sheets-Sheet 2

INVENTOR.
HENRY D. KLINKER,
BY
McMorrow, Berman & Davidson
ATTORNEYS.

United States Patent Office 2,779,630
Patented Jan. 29, 1957

2,779,630

WHEEL MOUNTING DEVICE

Henry D. Klinker, Bradenton, Fla.

Application March 16, 1956, Serial No. 572,127

3 Claims. (Cl. 301—9)

The present invention relates to vehicle wheels and in particular to a device for mounting a wheel having a certain number of stud receiving apertures upon a wheel hub having a different number of projecting studs.

The primary object of the present invention is to provide a means by which a single spare wheel and tire may be kept for two vehicles having wheel hubs with dissimilar numbers of studs on their wheel hubs normally supporting wheels and tires.

Another object of the present invention is to provide a wheel mounting means which is of simple construction, one compact in size, one easy to fabricate, and one economical to manufacture.

A further object of the present invention is to provide a device for mounting a wheel having a certain number of stud receiving apertures upon a hub having a greater or lesser number of wheel supporting studs, such device being capable of manufacture in any and all sizes to fit any and all types of vehicle wheels.

Figure 1:
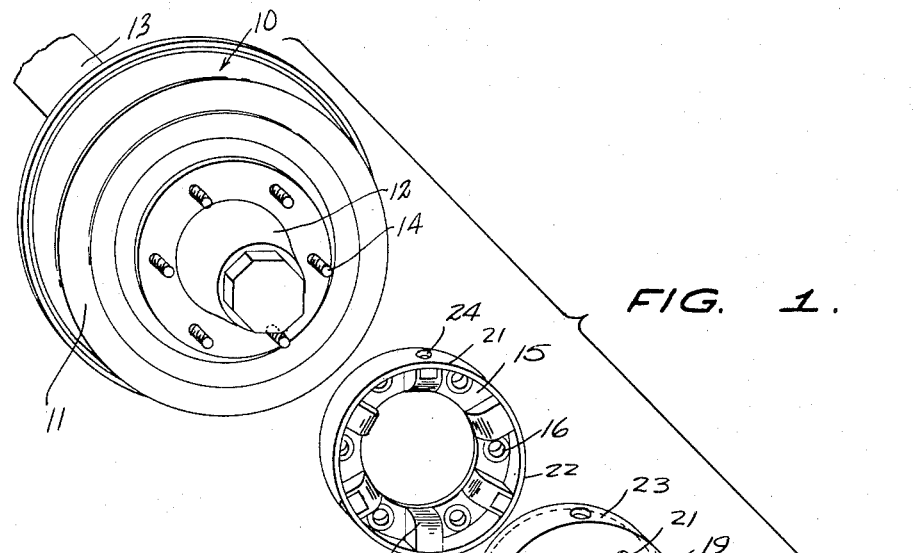
Figure 2:
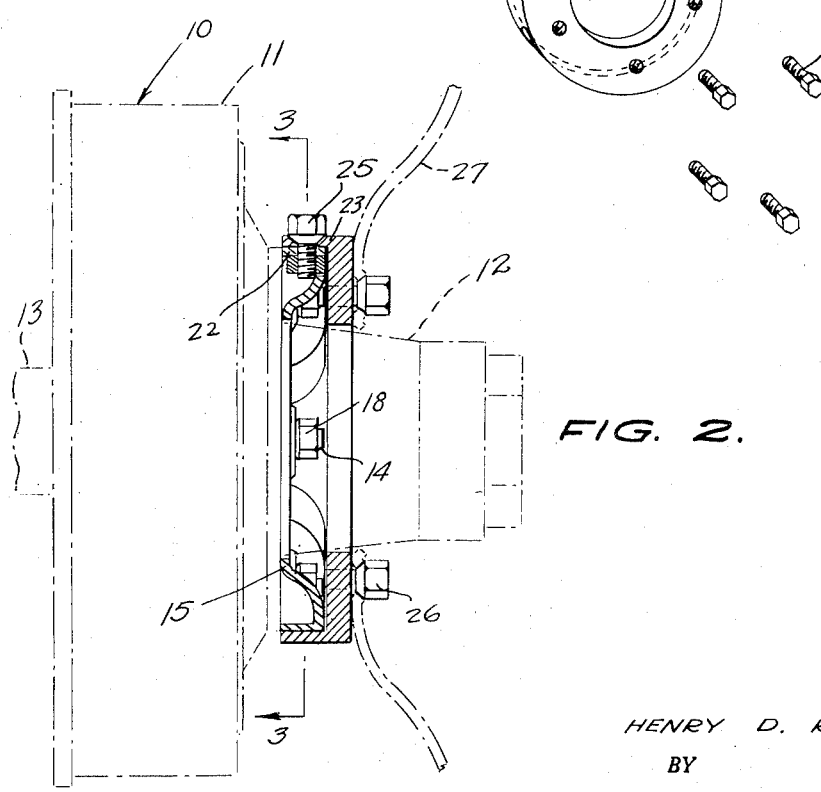
Figure 3:
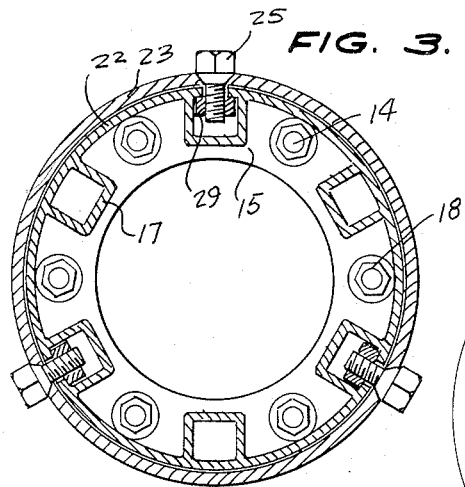
Figure 4:
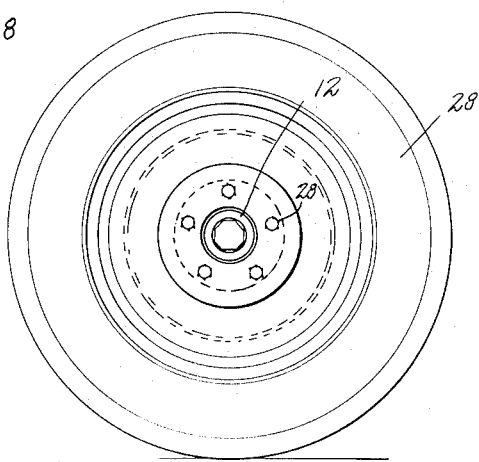
Figure 5:
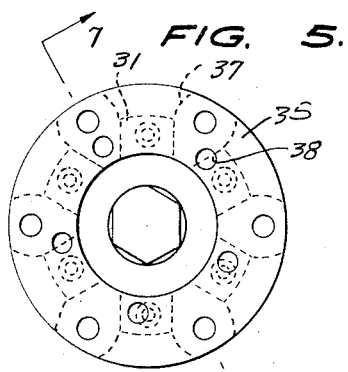
Figure 6:
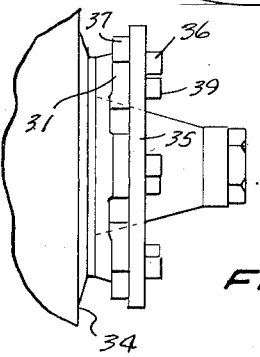
Figure 7:
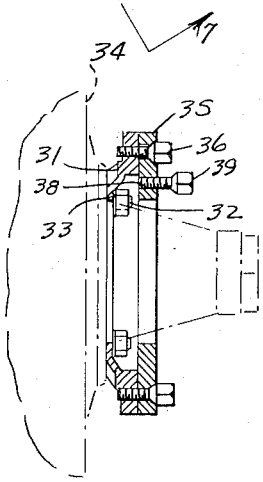

These and other objects and advantages of the present invention will be fully apparent from the following description when taken in connection with the annexed drawings, in which:

Figure 1 is an exploded perspective view of the components of the present invention shown in connection with a wheel hub on one end of an axle, the axle being shown broken away, Figure 2 is a sectional view, on an enlarged scale, of the components of Figure 1 shown in assembled condition, with the wheel hub and axle shown in dotted lines, Figure 3 is a sectional view taken on the line 3—3 of Figure 2, Figure 4 is an elevational view of a tire shown in attached position upon the wheel hub and mounting device of the present invention, Figure 5 is an elevational view of a second form of the present invention, Figure 6 is a side elevational view of the assembly of Figure 5, and Figure 7 is a sectional view taken on the line 7—7 of Figure 5.

Referring in greater detail to the drawings, in which like numerals indicate like parts throughout the several views, the present invention consists in a device for mounting a wheel on a vehicle wheel hub indicated generally by the reference numeral 10 and including a brake drum housing 11 and a bearing-containing hub portion 12 as shown most clearly in Figures 1 and 2. The hub 10 is supported upon an axle housing indicated by the reference numeral 13 in Figures 1 and 2, the axle housing being shown in broken away form.

The hub 10 has a plurality of studs 14 arranged in spaced relation thereabout and projecting perpendicularly from the one face of the brake drum housing 11. The studs 14 are here shown (Figure 1) as being six in number although a greater or lesser number of studs may be provided on the one face of the housing 11.

A first disc 15 is provided with six apertures 16 which are arranged in spaced relation therearound, the apertures receiving the studs 14 when the disc 15 is positioned in face to face abutting relation with respect to the one face of the housing 11. The first disc 15 is provided with box-like ribs 17 for reinforcing the same.

A nut 18 is provided for each one of the studs 14 for securing the first disc 15 to the housing 11 as shown in Figure 2.

A second disc 19 is arranged in face to face relation with respect to the first disc 15 covering the ends of studs 14 and has a plurality of apertures 21 of a greater or lesser number than the studs 14 and here shown as being five in number.

Means is provided for detachably securing the second disc 19 to the first disc 15 in spaced relation with respect to the first disc. Specifically, this means consists in a first rim 22 circumposed about the first disc 15 and having one end secured to and formed integrally with the periphery of the first disc 15.

The means also consists in a second rim 23 circumposed about the second disc 19 and having one edge secured to and formed integrally with the periphery of the second disc 19. The second disc 19 and its rim 23 are of such dimensions so that when the discs 15 and 19 are in face to face relation the second rim 23 surroundingly embraces the first rim 22.

Cooperating means is provided detachably securing the second rim 23 to first rim 22 for securing the discs 15 and 19 together. Specifically this cooperating means consists in a plurality of apertures arranged in spaced relation around the first rim 22, one of the apertures being shown in Figure 1 and indicated by the reference numeral 24. A stud 25 extends through the second rim 23 and is detachably received in each of the apertures 24 in the first rim 22.

Other studs 26 of a like number as the apertures 21 in the second disc 19 provide a means for attachment to the second disc 19 of a wheel having the same number of stud receiving apertures, the wheel being partially shown in dotted lines in Figure 2 and in full lines in Figure 4 and indicated by the reference numeral 27. A tire 28 is carried by the wheel as shown in Figure 4.

The apertures 24 may be threaded for receiving the studs 25 or they may be provided, as shown in Figure 3, with a nut 29 held within certain ones of the ribs 17 as shown in that figure.

In Figures 5 through 7, inclusive, a second form of the mounting device of the present invention is shown in which a first disc 31 is secured by studs 32 having nuts 33 thereon to the outer face of the brake drum housing 34, the latter being shown in dotted lines in Figure 7. Another disc 35 is arranged in face to face relation with respect to the disc 31 and cooperating fastening means such as the studs 36 detachably secure the disc 35 to the disc 31. The portions of the disc 31 which are threaded and which receive the studs 32 are rounded as shown in dotted lines in Figure 5 as indicated by the reference numeral 37.

The second disc 35 is provided with a plurality of threaded apertures 38 as shown in Figures 5 and 7 for receiving studs 39 for securing a wheel to the second disc 35. The hub of the wheel is not shown but is understood to be provided with recesses covering the ends of the studs 36. It will be seen that any number apertures 38 may be provided although five are here shown.

In either of the two embodiments of the present invention as here shown and described, a single spare tire and wheel may be kept for a pair of vehicles having different numbers of studs projecting from their brake drum housings for the support of wheels therein. This permits, as in the case of an automobile and trailer combination the saving of space and the expense of a spare tire for the trailer. The mounting device of the present invention may be compactly made and stowed within the storage or trunk compartment of the automobile and is readily available for attaching the automobile spare tire and wheel to the trailer wheel hub when necessary to replace a tire thereon.

Although two embodiments of the present invention have been here illustrated and described, it is believed that other embodiments may be made and practiced within the scope of the appended claims without departing from the spirit of the invention.

What is claimed is:

1. The combination with a vehicle wheel hub having a plurality of studs arranged in spaced relation about and projecting perpendicularly from one face thereof, of a mounting means secured to said studs for attachment thereto of a wheel having a different number of stud receiving apertures, said means comprising a first disc provided with apertures arranged in spaced relation therearound and having the apertures in numbers corresponding to that of said studs, said disc being positioned in face to face abutting relation with respect to said one face of said wheel hub with said apertures receiving said studs, a second disc arranged so as to cover the ends of said studs, means detachably securing said second disc in spaced relation with respect to said first disc, said second disc having apertures arranged in spaced relation therearound and having the apertures in number differing to that of said studs, and a stud detachably supported in each of the apertures of said second disc, said second disc studs together providing a means for attachment to said second disc of a wheel having a different number of stud receiving apertures than said first disc.

2. The combination with a vehicle wheel hub having a plurality of studs arranged in spaced relation about and projecting perpendicularly from one face thereof, of a mounting means secured to said studs for attachment thereto of a wheel having a different number of stud receiving apertures, said means comprising a first disc provided with apertures arranged in spaced relation therearound and having the apertures in numbers corresponding to that of said studs, said disc being positioned in face to face abutting relation with respect to said one face of said wheel hub with said apertures receiving said studs, a second disc arranged so as to cover the ends of said studs, means detachably securing said second disc in spaced relation with respect to said first disc, said means embodying a rim circumposed about said first disc and having one edge secured to the periphery of said first disc, a second rim circumposed about said second disc and having one edge secured to the periphery of said second disc, said second rim being arranged so as to surroundingly embrace said first rim, and cooperating means detachably securing said second rim to said first rim, and a stud detachably supported in each of the apertures of said second disc, said second disc studs together providing a means for attachment to said second disc of a wheel having a different number of stud receiving apertures than said first disc.

3. The combination of a vehicle wheel hub having a plurality of studs arranged in spaced relation about and projecting perpendicularly from one face thereof, of a mounting means secured to said studs for attachment thereto of a wheel having a different number of stud receiving apertures, said means comprising a first disc provided with apertures arranged in spaced relation therearound and having the apertures in numbers corresponding to that of said studs, said disc being positioned in face to face abutting relation with respect to said one face of said wheel hub with said apertures receiving said studs, a second disc arranged so as to cover the ends of said studs, means detachably securing said second disc in spaced relation with respect to said first disc, said means embodying a rim circumposed about said first disc and having one edge secured to the periphery of said first disc, a second rim circumposed about said second disc and having one edge secured to the periphery of said second disc, said second rim being arranged so as to surroundingly embrace said first rim, said first rim being provided with a plurality of apertures arranged in spaced relation therearound, a stud extending through said second rim detachably received in each of said first rim apertures, and a stud detachably supported in each of the apertures of said second disc, said second disc studs together providing a means for attachment to said second disc of a wheel having a different number of stud receiving apertures than said first disc.

References Cited in the file of this patent

UNITED STATES PATENTS

| | | |
|---|---|---|
| 1,846,448 | Nelson | Feb. 23, 1932 |
| 2,570,559 | Juergenson | Oct. 9, 1951 |